United States Patent
Kim et al.

(10) Patent No.: US 9,921,706 B2
(45) Date of Patent: Mar. 20, 2018

(54) METHOD AND APPARATUS FOR TRACKING INPUT POSITIONS VIA ELECTRIC FIELD COMMUNICATION

(75) Inventors: Sae Rome Kim, Suwon-si (KR); Jong Rim Lee, Seoul (KR); Chang Ryong Heo, Seoul (KR); Kyung Mo Park, Seou (KR); Chul Jin Kim, Yongin-si (KR); Seong Jun Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 1123 days.

(21) Appl. No.: 12/783,255

(22) Filed: May 19, 2010

(65) Prior Publication Data
US 2010/0295809 A1    Nov. 25, 2010

(30) Foreign Application Priority Data

May 19, 2009    (KR) ........................ 10-2009-0043345

(51) Int. Cl.
| | |
|---|---|
| *G09G 1/00* | (2006.01) |
| *G06F 3/046* | (2006.01) |
| *G06F 3/044* | (2006.01) |
| *G06F 3/01* | (2006.01) |
| *G06F 3/041* | (2006.01) |

(52) U.S. Cl.
CPC .............. *G06F 3/046* (2013.01); *G06F 3/044* (2013.01); *G06F 3/011* (2013.01); *G06F 3/041* (2013.01); *G06F 2203/04104* (2013.01)

(58) Field of Classification Search
USPC ................................................. 345/156–179
See application file for complete search history.

(56) References Cited

U.S. PATENT DOCUMENTS

| | | | |
|---|---|---|---|
| 5,402,151 A * | 3/1995 | Duwaer ..................... 345/173 |
| 5,914,701 A | 6/1999 | Gersheneld et al. |
| 5,956,020 A * | 9/1999 | D'Amico et al. ............ 345/173 |
| 6,373,474 B1 | 4/2002 | Katabami |
| 6,624,804 B2 | 9/2003 | Sterling |
| 2003/0165801 A1 | 9/2003 | Levy |
| 2003/0184523 A1* | 10/2003 | Badaye et al. ................ 345/173 |
| 2003/0214486 A1 | 11/2003 | Roberts |
| 2003/0234769 A1* | 12/2003 | Cross et al. ................... 345/173 |
| 2004/0189594 A1 | 9/2004 | Sterling |
| 2004/0239648 A1* | 12/2004 | Abdallah et al. ............. 345/173 |

(Continued)

FOREIGN PATENT DOCUMENTS

| | | |
|---|---|---|
| DE | 20 2007 007 456 | 11/2007 |
| JP | 03-828474 | 7/2006 |

(Continued)

OTHER PUBLICATIONS

Korean Office Action dated Jan. 8, 2016 issued in counterpart application No. 10-2009-0043345, 4 pages.

*Primary Examiner* — Michael Faragalla
(74) *Attorney, Agent, or Firm* — The Farrell Law Firm, P.C.

(57) ABSTRACT

A method and apparatus for tracking input positions via Electric Field Communication (EFC) are provided. The apparatus includes a plurality of receiving electrodes for EFC and a receiver unit. The receiving electrodes detect strengths of input electric fields. The receiver unit compares the strengths of the input electric fields with each other and generates position information regarding the input electric fields.

11 Claims, 10 Drawing Sheets

(56) References Cited

U.S. PATENT DOCUMENTS

| | | |
|---|---|---|
| 2005/0088416 A1* | 4/2005 | Hollingsworth ............ 345/173 |
| 2005/0243069 A1* | 11/2005 | Yorio et al. ................ 345/173 |
| 2006/0202971 A1* | 9/2006 | Kaliher ....................... 345/173 |
| 2006/0267385 A1 | 11/2006 | Steenwyk et al. |
| 2006/0279548 A1 | 12/2006 | Geaghan |
| 2007/0279399 A1* | 12/2007 | Nishimura et al. .......... 345/179 |
| 2008/0048989 A1* | 2/2008 | Yoon et al. ................. 345/173 |
| 2009/0079707 A1* | 3/2009 | Kaehler et al. ............. 345/174 |
| 2009/0109181 A1* | 4/2009 | Hui et al. .................... 345/173 |
| 2009/0122021 A1* | 5/2009 | Liu et al. ..................... 345/173 |
| 2009/0207130 A1* | 8/2009 | Chen et al. ................. 345/156 |
| 2009/0237372 A1* | 9/2009 | Kim et al. ................... 345/173 |
| 2010/0060588 A1* | 3/2010 | Fong ............................ 345/173 |

FOREIGN PATENT DOCUMENTS

| | | |
|---|---|---|
| JP | 2007-189309 | 7/2007 |
| JP | 04-191736 | 9/2008 |
| JP | 2008-537611 | 9/2008 |
| JP | 4191736 | 9/2008 |
| KR | 1999-0008428 | 1/1999 |
| KR | 2001-0096485 | 11/2001 |
| WO | WO 99/52027 | 10/1999 |
| WO | WO 2005/043595 | 5/2005 |
| WO | WO 2006/133018 | 12/2006 |
| WO | WO 2009/042422 | 4/2009 |

\* cited by examiner

METHOD AND APPARATUS FOR TRACKING INPUT POSITIONS VIA ELECTRIC FIELD COMMUNICATION

PRIORITY

This application claims priority under 35 U.S.C. 119(a) to an application filed in the Korean Intellectual Property Office on May 19, 2009, and assigned Serial No. 10-2009-0043345, the contents of which are incorporated herein by reference.

BACKGROUND OF THE INVENTION

1. Field of the Invention

The present invention relates generally to a tracking technology, and more particularly, to a method and apparatus for tracking input positions via Electric Field Communication (EFC), where the apparatus provides a multi-touch function in a non-contact manner.

2. Description of the Related Art

Touch screens are currently being developed that employ EFC technology. The concept of EFC is similar to that of Radio Frequency (RF) mobile communication. EFC technology uses human skin as a communication medium, instead of RF. EFC has a data transmission rate of about 2 Megabytes per second (Mbps) and consumes approximately 5 milliWatts (mW) of power, which provides excellent performance compared with other communication methods.

Touch screens display devices that can display a variety of images, letters, etc. They are able to detect a position on the screen or receive information according to the touch of a user's finger, for example, so that software can perform a data process based on the touch and then display the processed result. A touch screen includes a touch panel on which infrared lights are formed in a grid so that it is able to detect a position when a user's finger or an object touches the grid on the screen. Specifically, when a user's finger touches a letter or an image displayed on the screen of the touch panel, the touch screen detects a position corresponding to the user's touched item so that the system can process a corresponding command. Touch screens allow users to easily acquire required information.

However, conventional touch screens are disadvantageous in that they need to detect a user's direct touch, a single position touch, various and complicated inputs, or the like. Conventional touch screens are also disadvantageous because they require additional costs to enhance the resolution. More specifically, it may be impossible to enhance the sensitivity of the touch screen.

SUMMARY OF THE INVENTION

The present invention has been made to address at least the above problems and/or disadvantages and to provide at least the advantages described below. Accordingly, an aspect of the present invention provides a method and apparatus for tracking input positions via EFC, where the apparatus provides a multi-touch function in a non-contact manner.

According to one aspect of the present invention, an apparatus is provided for tracking input positions via EFC. The apparatus includes a plurality of receiving electrodes for EFC for detecting strengths of input electric fields, and a receiver unit for comparing the strengths of the input electric fields with each other and generating position information regarding the input electric fields.

According to another aspect of the present invention, a method is provided for tracking input positions via EFC. Strengths of electric fields that are received are measured by receiving electrodes for EFC. The measured strengths of the electric fields are compared with each other. Position information regarding the input positions is generated based on a result of comparing the measured strengths.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar reference numbers are used throughout the drawings to refer to the same or similar parts. Detailed descriptions of constructions or processes known in art may be omitted to avoid obscuring the subject matter of the present invention.

The terms or words described in the present description and the claims should not be limited by a general or lexical meaning, and instead should be analyzed in accordance with a meaning and a concept through which the inventor defines and describes the present invention to comply with the idea of the present invention.

Figure 1:
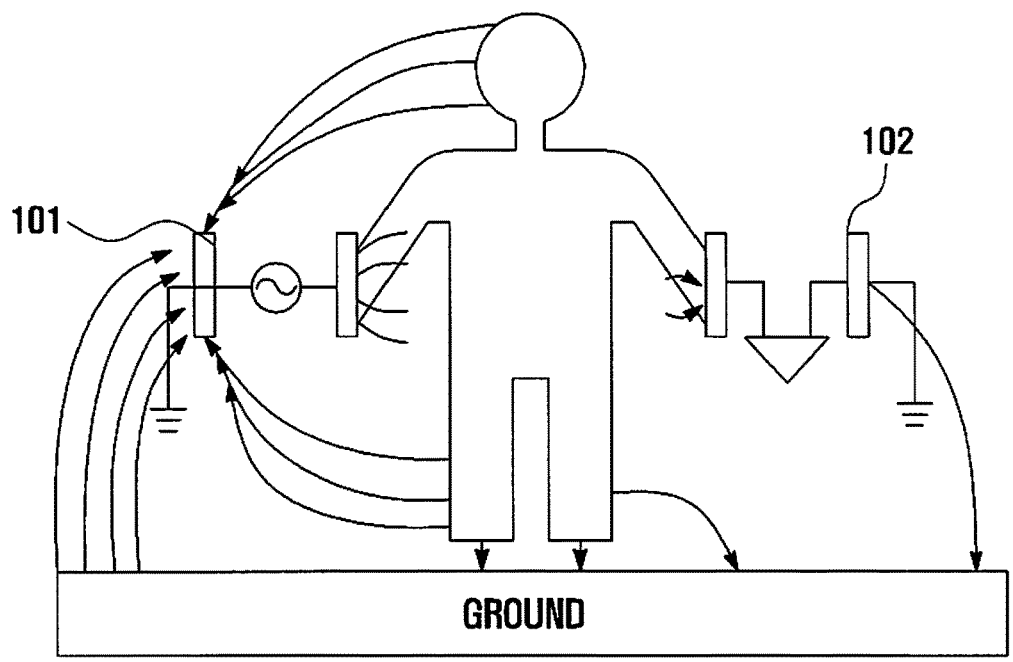
FIG. 1 is a diagram illustrating a concept regarding the principle of EFC.

Referring initially to FIG. 1, a diagram illustrates a concept regarding the principle of EFC.

EFC relates to a technology that allows for information transmission/reception using changes in the electric fields of the human body. Specifically, EFC technology implements data communication via the human body instead of a cable. Since the human body is conductive, it forms electric fields there around when current flows in the human body.

When a transmitter 101 attached to the user's body is supplied with a voltage, the voltage causes a change in the electric fields on the surface of the user's body. Simultaneously, this change in the electric fields also causes a change in the strength of a signal received by a receiving electrode 102 near the user's body. EFC technology analyzes the change in the received signal strength and then detects corresponding information.

Since EFC uses a 12-16 MegaHertz (MHz) frequency band, instead of an RF band, a received signal strength is determined not by a certain portion of an electric field (a weak electric field or a strong electric field) but by characteristics of an individual's human body (which serves as a capacitor) and a distance between the transmitter 101 and the receiving electrode 102. Therefore, a transmission/reception level may differ according to a particular user who will use EFC (or whether a communication channel is determined through contact between two users or among a plurality of users) or according to a distance (from the ears to the leg or from the wrists to the fingers, etc.) along which a user uses EFC.

Figure 2:
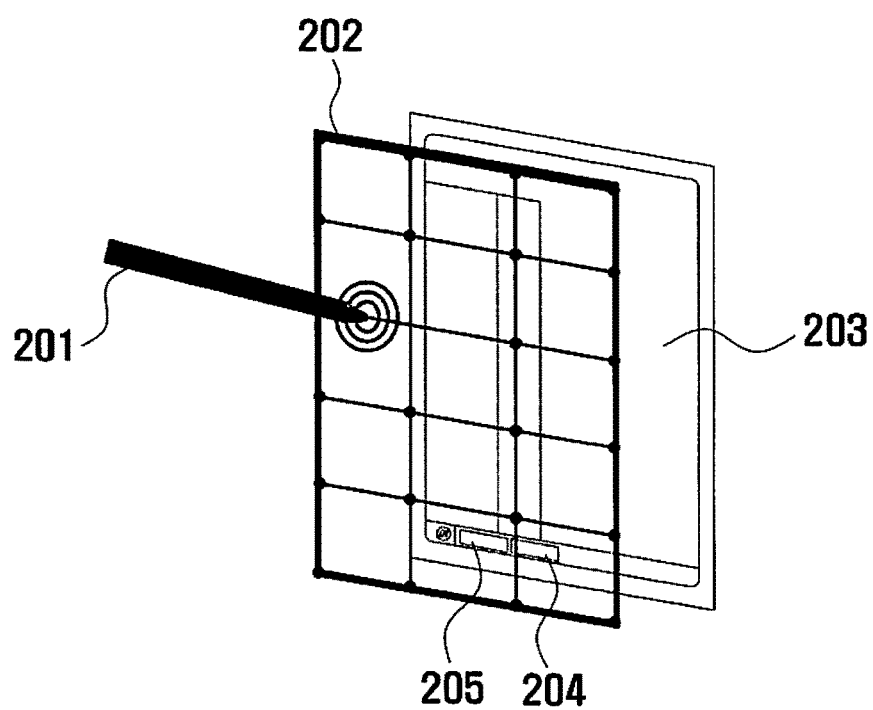
FIG. 2 is a diagram illustrating an apparatus for tracking input positions via EFC, according to an embodiment of the present invention.

FIG. 2 is a diagram illustrating an apparatus for tracking input positions via EFC, according to an embodiment of the present invention.

Referring to FIG. 2, the apparatus includes an EFC transmitter 201, an EFC receiving electrode array 202, which is shaped as a grid for measuring the magnitude of input electric fields, a display panel 203, a receiver IC 204, and a display controller 205. In an embodiment of the present invention, the receiver IC 204 is an example of a receiver unit. Although the receiver unit is implemented with an IC, it should be understood that the present invention is not limited to this embodiment. For example, the receiver unit may be implemented with software or hardware. In the following description, the embodiment will be described based on the receiver IC 204.

The EFC transmitter 201 is attached to the human body. The EFC transmitter 201 supplies a voltage to the human body to form electric fields on the surface of the human body. The EFC receiving electrode array 202 detects the magnitude of the input electric fields and transmits information regarding the detected magnitude of the input electric fields to the receiver IC 204.

The receiver IC 204 serves as an EFC signal detector that analyzes the information regarding the magnitude of the input electric fields and detects the user's voltage input position. The display panel 203 may be implemented with an information display device, for example, a Liquid Crystal Display (LCD), a Plasma Display Panel (PDP), a Light Emitting Diode (LED), a presentation display device using a projection screen or a hologram, etc. The display controller 205 controls the display panel 203 to display information, such as images transmitted from a system.

In an embodiment of the present invention, the user's voltage input position is detected via EFC technology. Since EFC uses a frequency band corresponding to a near-field area, its close loop characteristic is larger than the radiation characteristic. Using this characteristic, the voltage input position can be detected only when the transmitter and the receiving electrode are close to each other. The EFC receiving electrode array 202 is located at four edges of the display panel 203 to be measured and then the user with the EFC transmitter can place his/her hand at a position on the panel 203 that he/she wants to indicate. The magnitudes of the input electric fields are measured differently at every EFC receiving electrode array 202 installed to the four edges. These differently measured values approximately detect the user's indicated position.

If the user's body approaches a particular position of the EFC receiving electrode array 202 and electric fields are applied thereto, the receiver IC 204 analyzes the magnitudes of input electric fields, measured by the electrodes at four locations, and compares them with each other, thereby detecting the position to which the user's input is applied. The detected position information regarding the input electric fields can form one frame per preset time period so that it can be converted into two-dimensional image data. The position where the user's input is input and the direction that the user's input is moved can be detected using the two-dimensional data. If the two-dimensional data is arrayed in grid, a multi-touch can be recognized in a non-contact method. The position, movement direction, and movement distance of the input signal are transmitted to the system, so that they can be displayed thereon in a preset manner, or so that they can be linked to a particular command.

Figure 3:
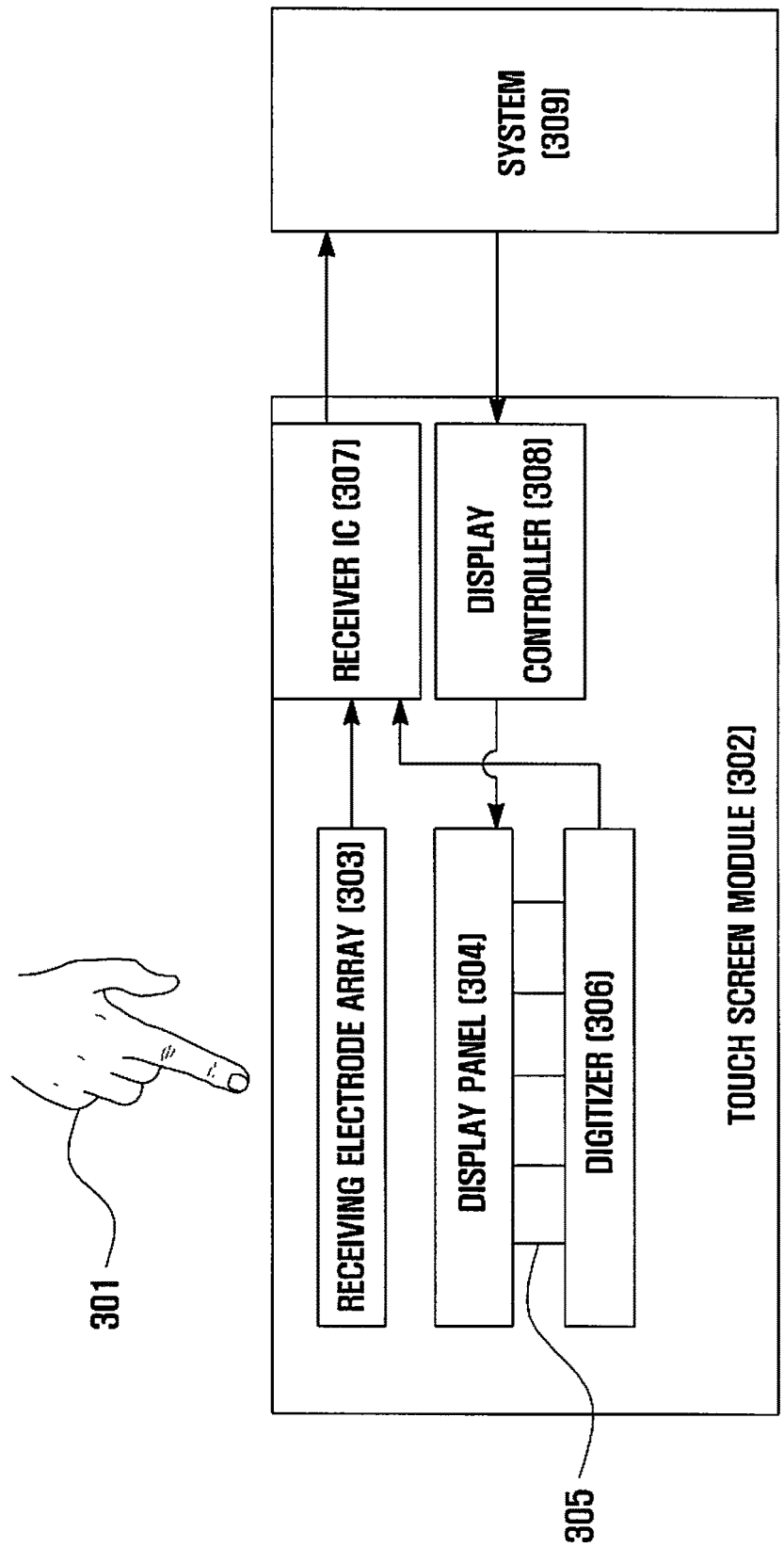
FIG. 3 and FIG. 4 are diagrams illustrating embodiments of an apparatus for tracking input positions via EFC, according to the present invention.
Figure 4:
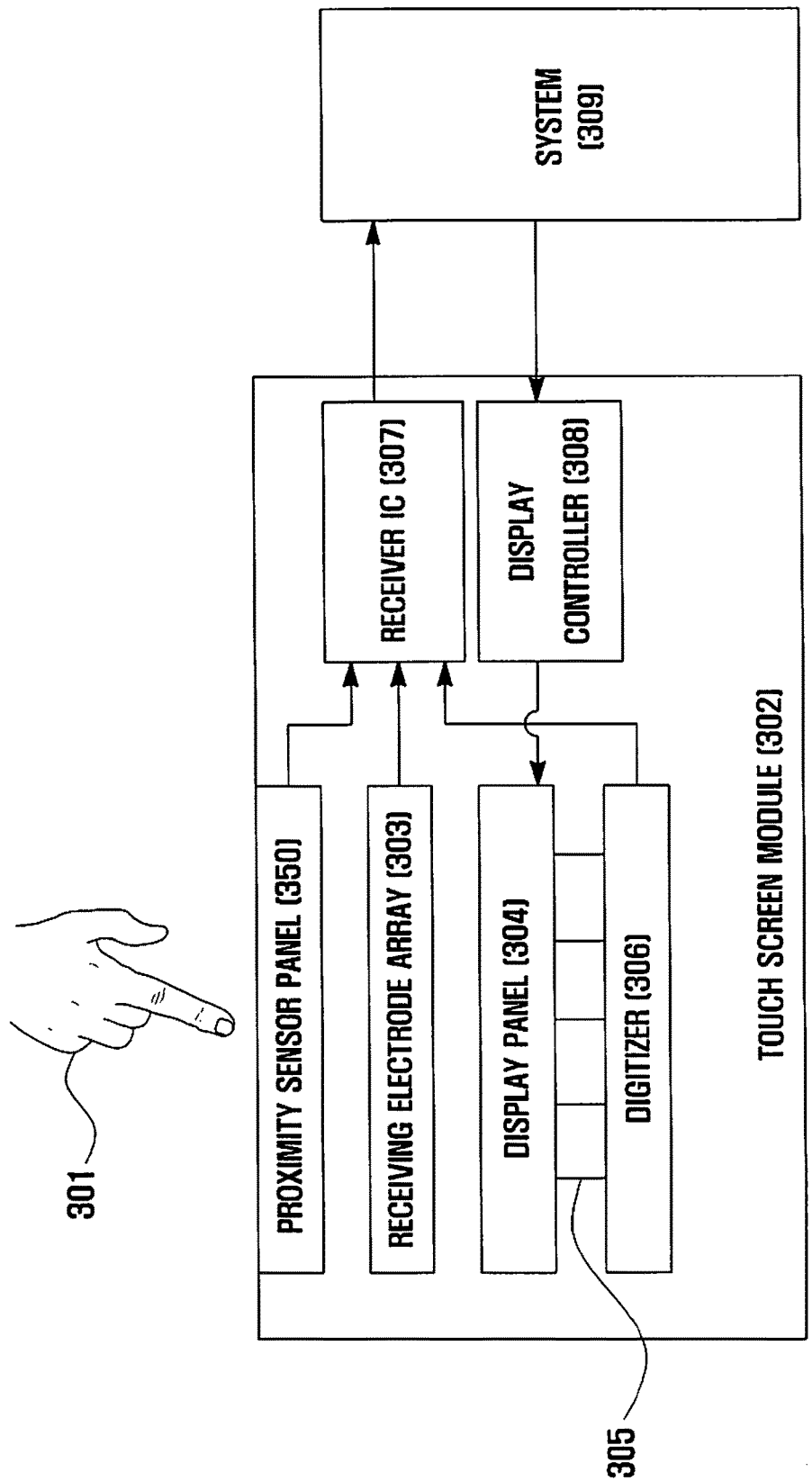

FIG. 3 and FIG. 4 are diagrams illustrating embodiments of an apparatus for tracking input positions via EFC, according to the present invention.

Referring to FIG. 3, a first embodiment of the apparatus includes a transmitter 301, a touch screen module 302, and a system 309. The transmitter 301 is attached to the user's body. The transmitter 301 supplies voltage to the user's body resulting in electric fields on the surface of the user's body. The system 309 transmits information to be displayed to the touch screen module 302 and executes a preset function according to a signal output from the touch screen module 302.

The touch screen module 302 includes a receiving electrode array 303, a display panel 304, bit lines 305, a digitizer 306, a receiver IC 307, and a display controller 308. The receiving electrode array 303 measures the magnitude of the input electric fields that are induced on the surface of the user's body by the transmitter 301, and transmits the measured magnitude of the input electric fields to the receiver IC 307. The display controller 308 controls the display panel 304 to display information, such as images transmitted from the system 309.

The digitizer 306 is connected to the display panel 304 via the bit lines 305. The digitizer 306 digitizes coordinate information regarding the display panel 304 and transmits the digital coordinate information to the receiver IC 307. The receiver IC 307 creates position information regarding electric fields input to the display panel 304 and movement information regarding the position information, using the coordinate information regarding the display panel 304 and the information regarding the magnitude of input electric fields. The receiver IC 307 then transmits the position information and the movement information to the system 309.

Referring to FIG. 4, a second embodiment of the apparatus is implemented in a manner similar to the first embodiment and further includes a proximity sensor 350. The proximity sensor 350 measures how close applied electric fields approach the apparatus and outputs its measured value to the receiver IC 307, so that it can also provide a value to compensate the magnitude of the input electric fields according to a degree of proximity in order to measure the position or the movement direction of the input electric fields.

In the second embodiment of the apparatus shown in FIG. 4, although the proximity sensor 350 is located at the upper side of the receiving electrode array 303, the second embodiment may be modified in such a way that the proximity sensor 350 is located at the lower side of the receiving electrode array 303, having the same effect as the second embodiment.

FIG. 5 to FIG. 9 are diagrams illustrating examples to which the apparatus for tracking input positions via EFC is applied, according to an embodiment of the present invention.

Figure 5:
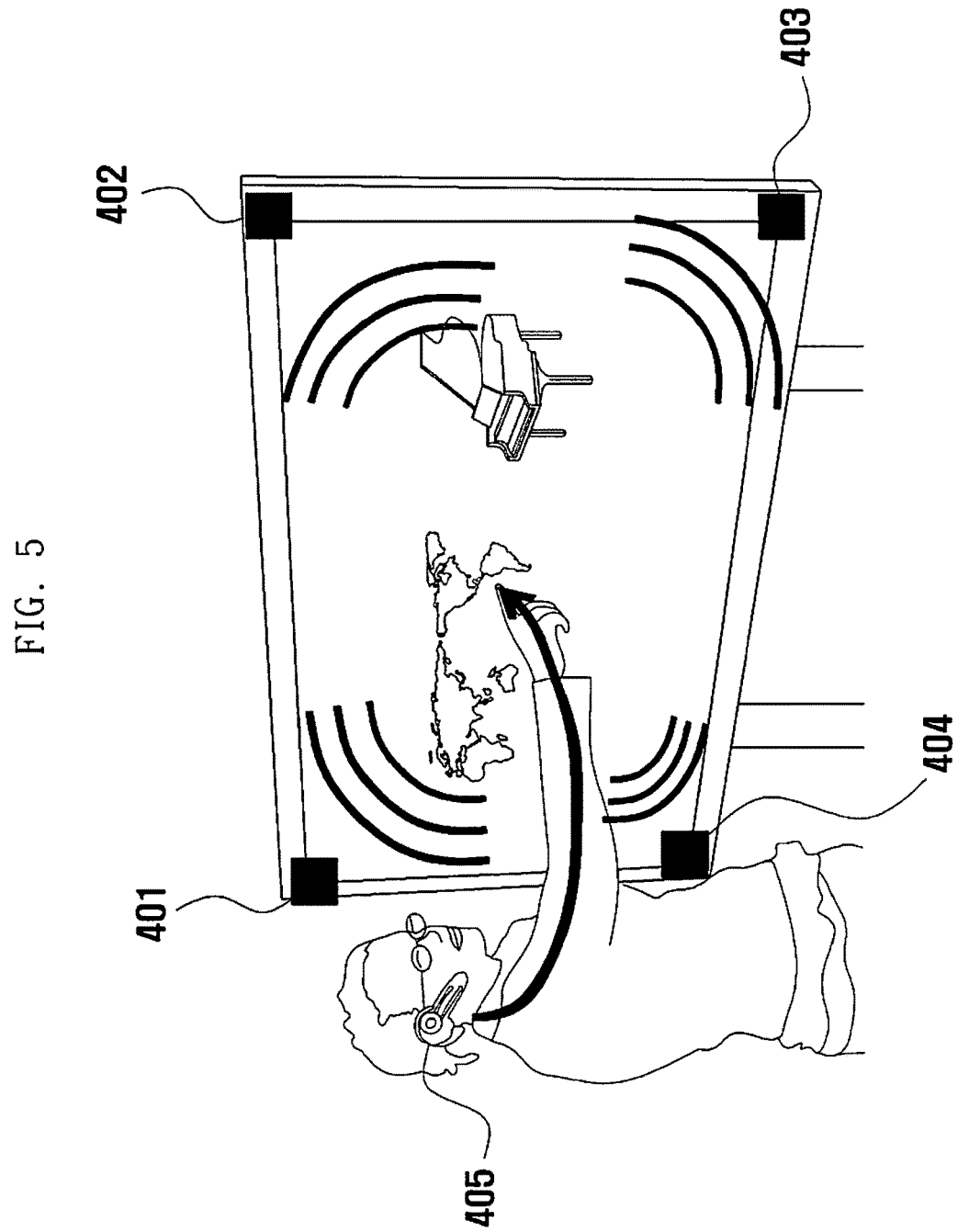
FIG. 5 to FIG. 9 are diagrams illustrating examples to which the apparatus for tracking input positions via EFC is applied, according to an embodiment of the present invention.

FIG. 5 illustrates an LCT TV to which the apparatus for tracking input positions via EFC is applied, according to an embodiment of the present invention. The LCD TV arrays EFC receiving electrodes 401, 402, 403, and 404 at its four corners, respectively. The user has an EFC transmitter 405 attached to his/her body. When the user's finger approaches the LCD TV, and does not touch it, the electric fields, induced on the surface of the user's body by the EFC transmitter 405, are applied to the EFC receiving electrodes 401 to 404 via the user's finger. The EFC receiving electrodes 401 to 404 measure the magnitudes of the input electric fields and detect the position of the user's input. This operation could also be applied to select a particular function and execute the function.

Figure 6:
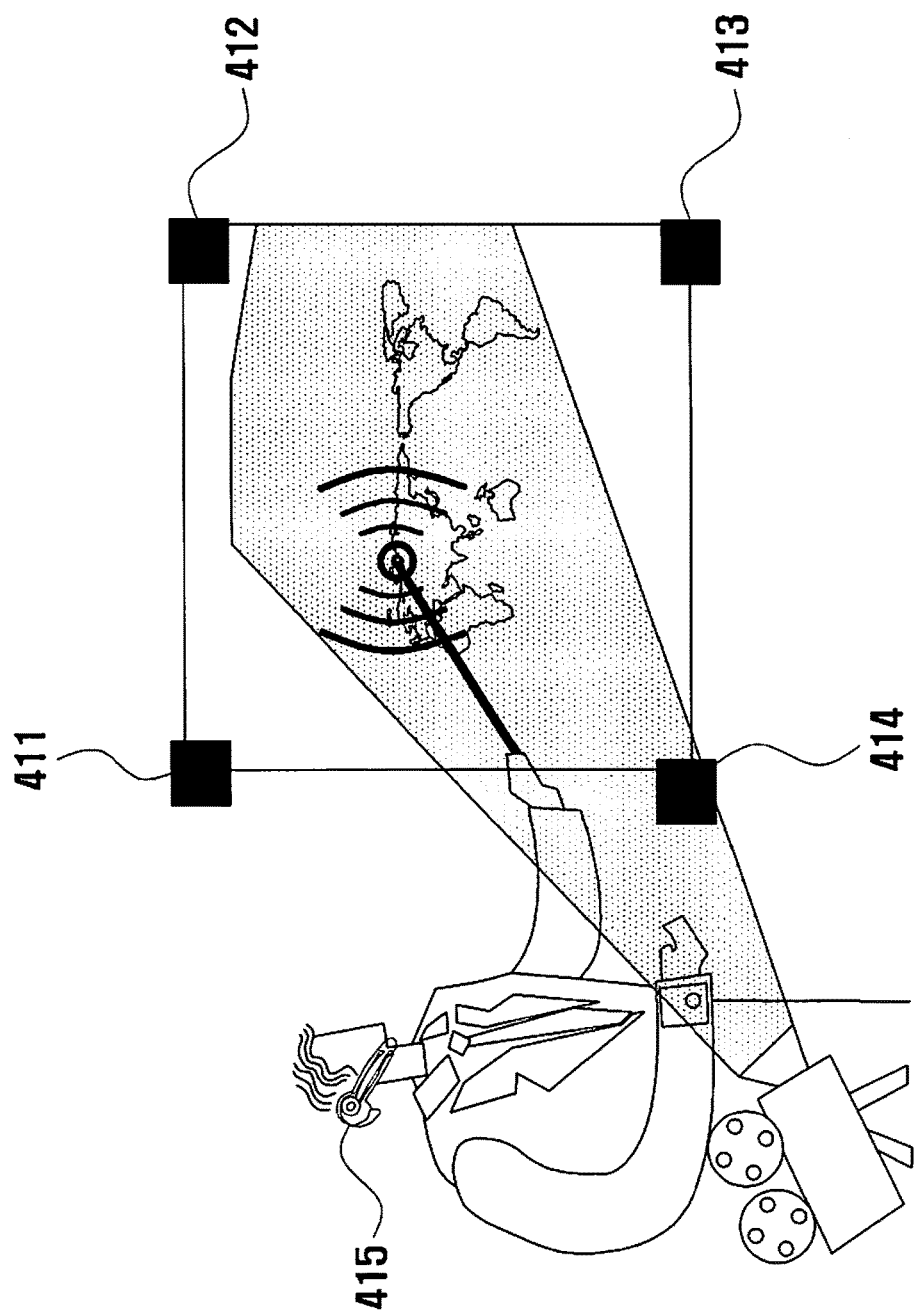

FIG. 6 illustrates a presentation device using a projection screen or a hologram to which the apparatus for tracking input positions via EFC is applied, according to an embodiment of the present invention. The presentation device arrays EFC receiving electrodes 411, 412, 413, and 414 at its four corners, respectively. The user has an EFC transmitter 415 attached to his/her body. Like the LCD TV shown in FIG. 5, when the user approaches the presentation device with a conductive pointing device 416 without touching it, the electric fields, induced on the pointing device 416 by the EFC transmitter 415, are applied to the EFC receiving electrodes 411 to 414. The EFC receiving electrodes 411 to 414 measure the magnitude of the input electric fields and detect the position of the user's input via the pointing device 416. This position information is transmitted to the system to select a particular menu and execute a corresponding function. The operation could be applied to turn pages of presentation documents.

Figure 7:
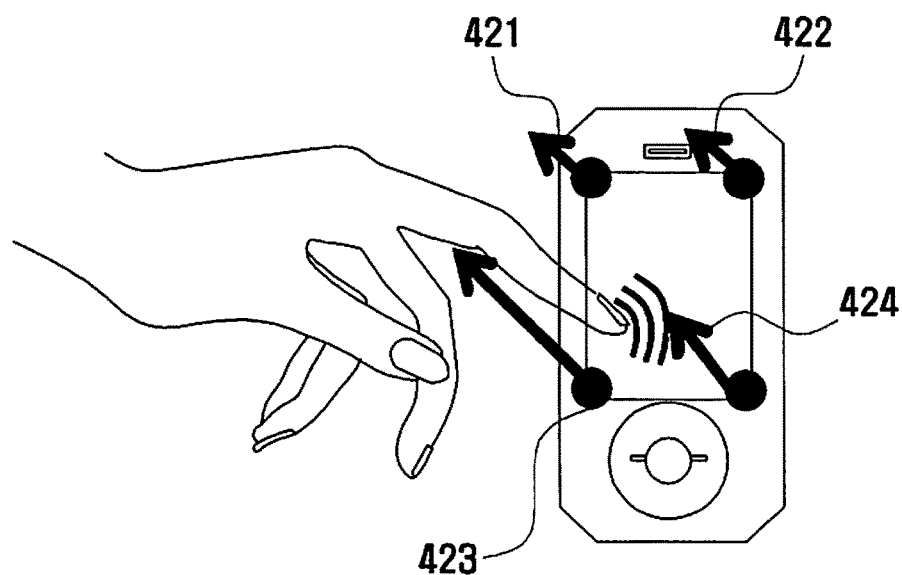
Figure 8:
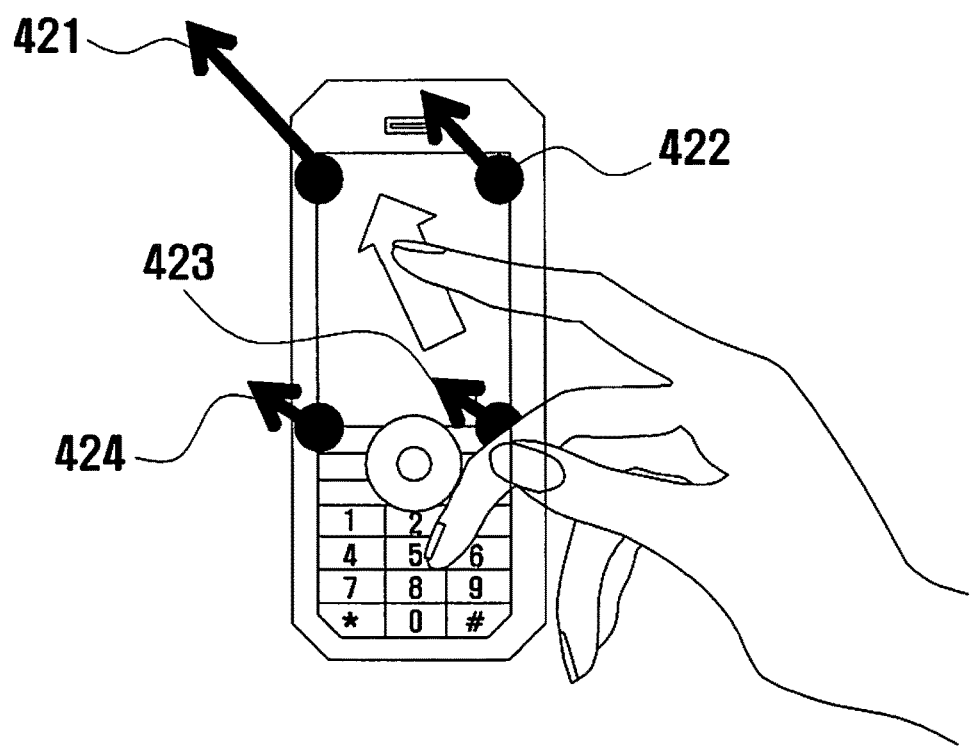

FIG. 7 and FIG. 8 illustrate portable terminals with display units to which the apparatus for tracking input positions via EFC is applied, according to an embodiment of the present invention. Each of the display units arrays EFC receiving electrodes 421, 422, 423, and 424 at its four corners, respectively. The user has an EFC transmitter attached to his/her body.

Referring to FIG. 7, when the user approaches a particular corner of the display unit with his/her finger, the magnitude of the input electric fields, measured by an EFC receiving electrode located at the particular corner of the display unit, is greater than those measured by the EFC receiving electrodes located at the remaining corners of the display unit. Therefore, the apparatus for tracking input positions can simply detect the position of the user's input.

Referring to FIG. 8, when the user approaches the display unit of the portable terminal with his/her finger and moves his/her finger in a particular direction, the apparatus for tracking input positions measures the position of an EFC receiving electrode where the user's input occurs, forms position information regarding user's inputs during the preset time period with a single frame, and converts it to two-dimensional image data. The position where the user's input is input and the direction to which the user's input is moved can be detected using the two-dimensional data. The two-dimensional data can also be used to replace screens and menus.

Figure 9:
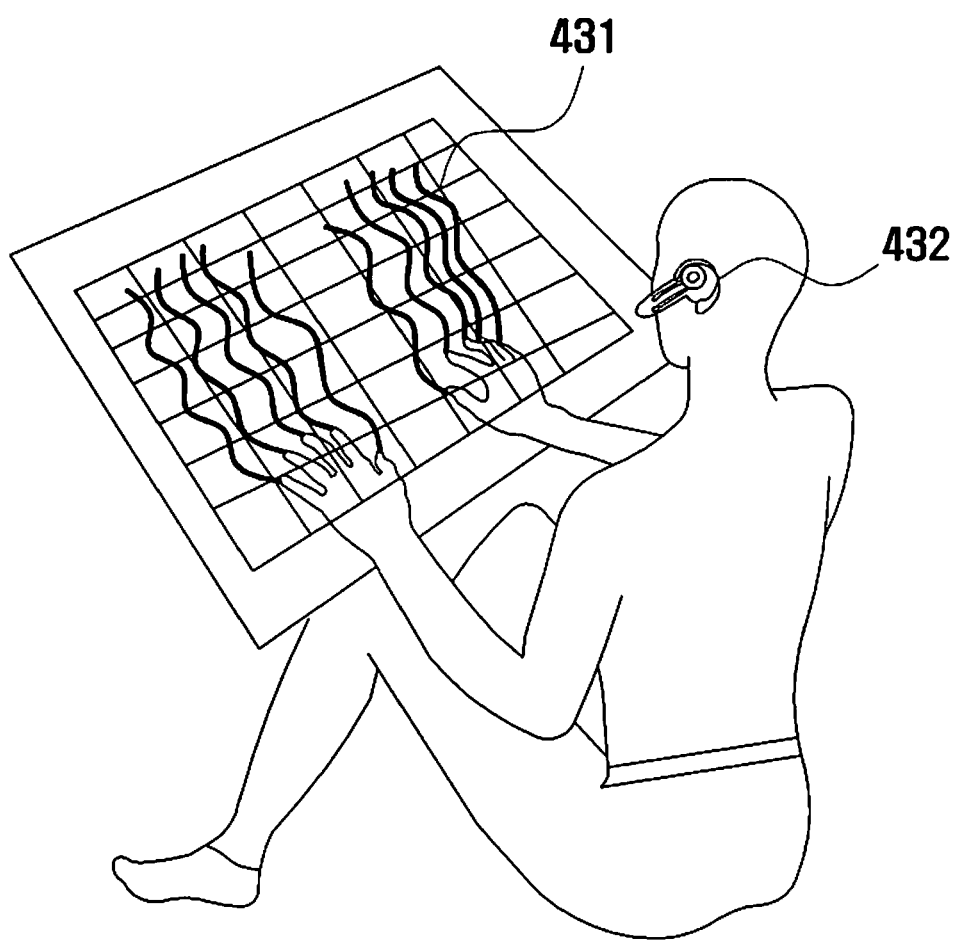

FIG. 9 illustrates a multi-touch input device to which the apparatus for tracking input positions via EFC is applied, according to an embodiment of the present invention. As shown in FIG. 9, the multi-touch input device includes an EFC receiving electrode array 431 formed in grid on the entire touch screen as well as at the edges of the touch screen. The user has an EFC transmitter 432 attached to his/her body. Since the multi-touch input device includes a plurality of EFC receiving electrodes, arrayed in grid, forming an array, the system for tracking input positions measures the magnitudes of the plurality of input electric fields and creates position information regarding the input electric fields, which allows it to support a multi-touch function.

Figure 10:
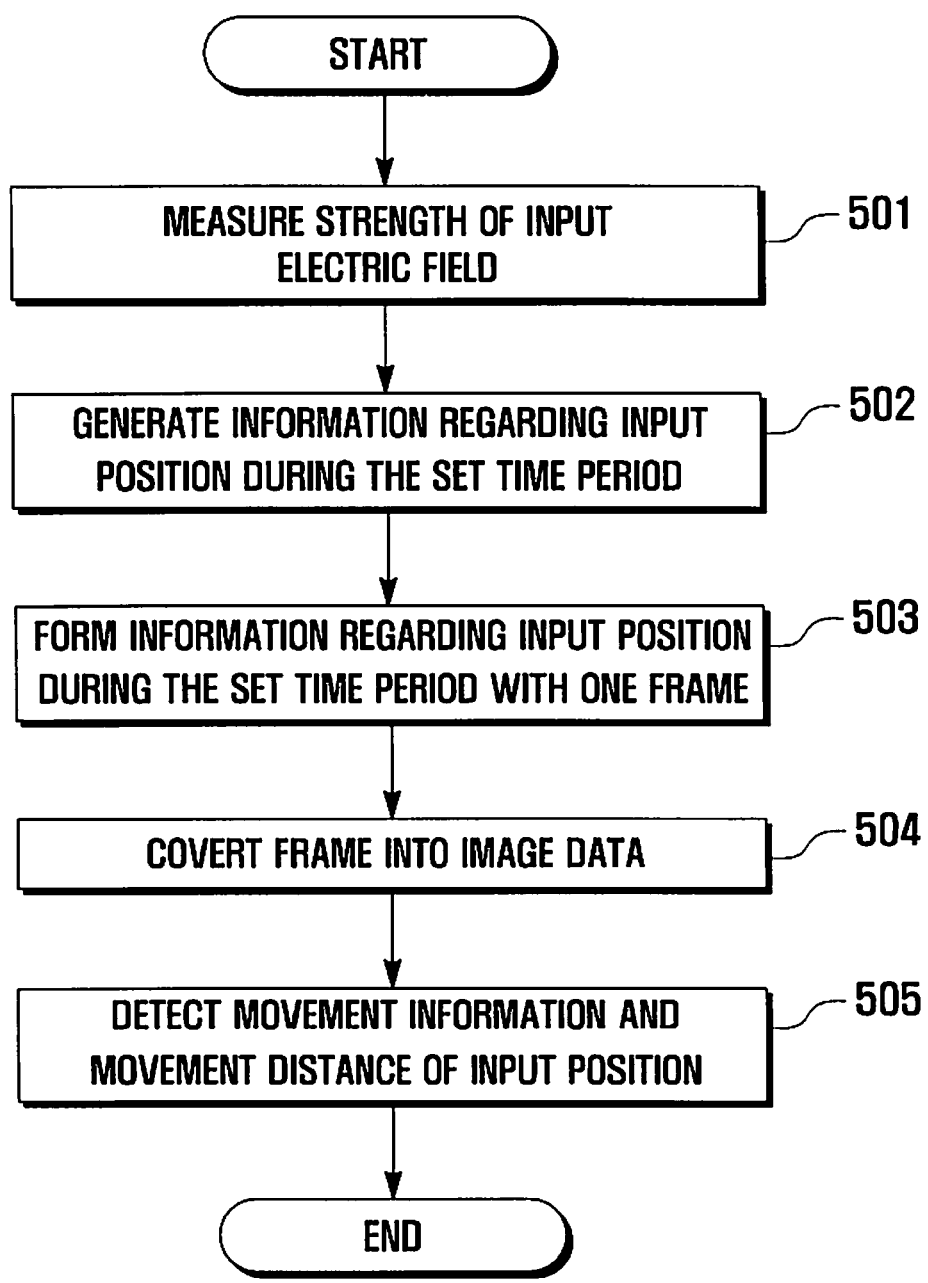
FIG. 10 is a flow chart illustrating a method for tracking input positions via EFC, according to an embodiment of the present invention.

FIG. 10 is a flow chart illustrating a method for tracking input position via EFC, according to an embodiment of the present invention.

Referring to FIG. 10, an EFC receiving electrode receives electric fields applied by a user with an EFC transmitter and measures the magnitude of the input electric fields in step 501. For example, if a user approaches an LCD TV or a presentation device, to which the apparatus according to the present invention is applied, with his/her finger or a pointing device, the EFC receiving electrode measures the magnitude of the input electric fields.

A receiver IC creates position information regarding input electric fields using the information regarding the magnitude of the input electric fields measured at each EFC receiving electrode in step 502. Specifically, the EFC receiving electrodes formed in grid measure the magnitudes of input electric fields, compares the magnitudes with each other, and detect the positions of the input electric fields. The receiver IC forms position information regarding input electric fields, created during a present time period, into a single frame in step 503. The receiver IC converts the single frame into image data in step 504. The receiver IC detects movement information and movement distance of the input position, using the image data in step 505.

Figure 11:
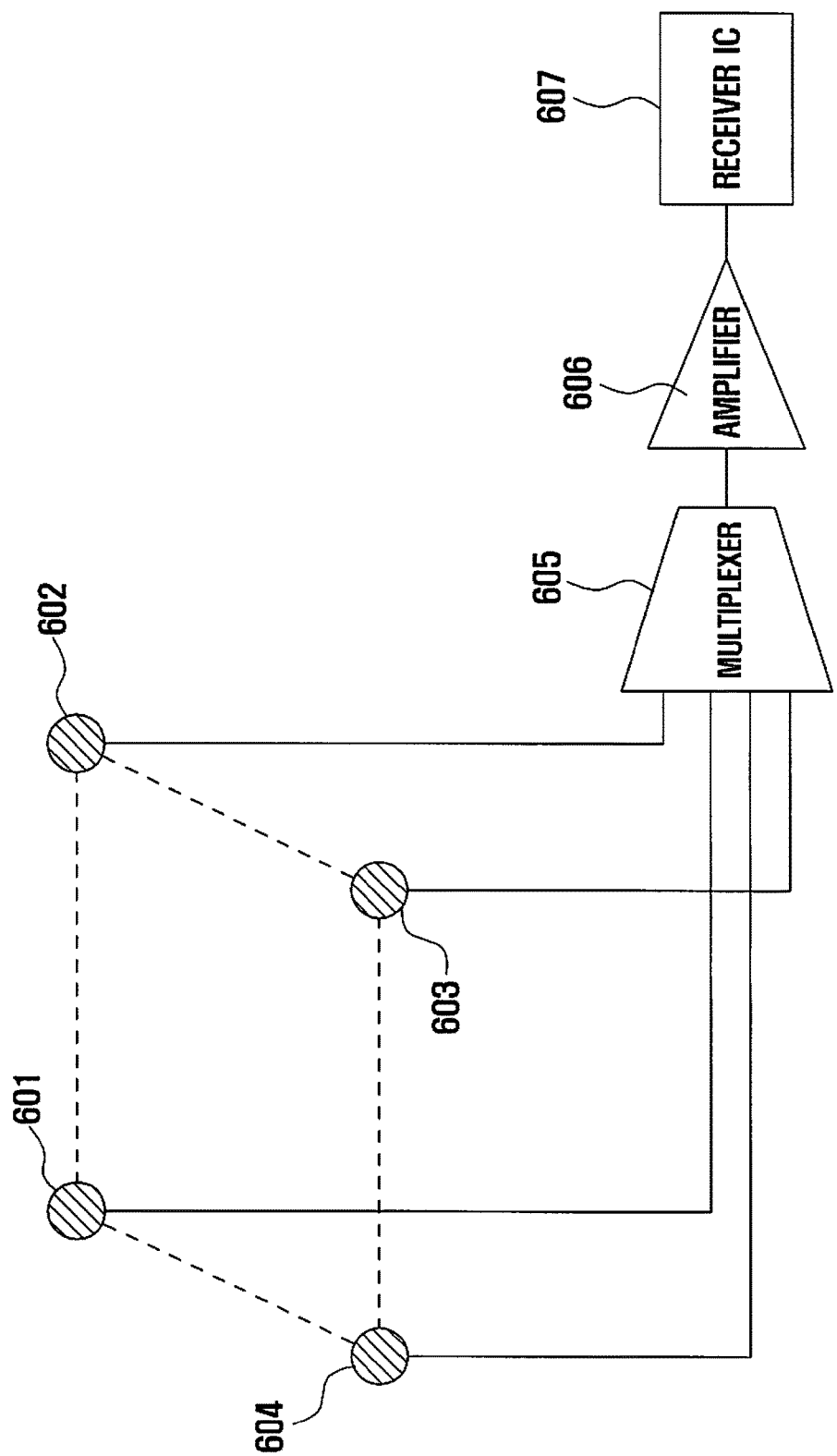
FIG. 11 and FIG. 12 are diagrams illustrating a connection between a receiving electrode array and a receiver IC, in the apparatus for tracking input positions via EFC, according to an embodiment of the present invention.
Figure 12:
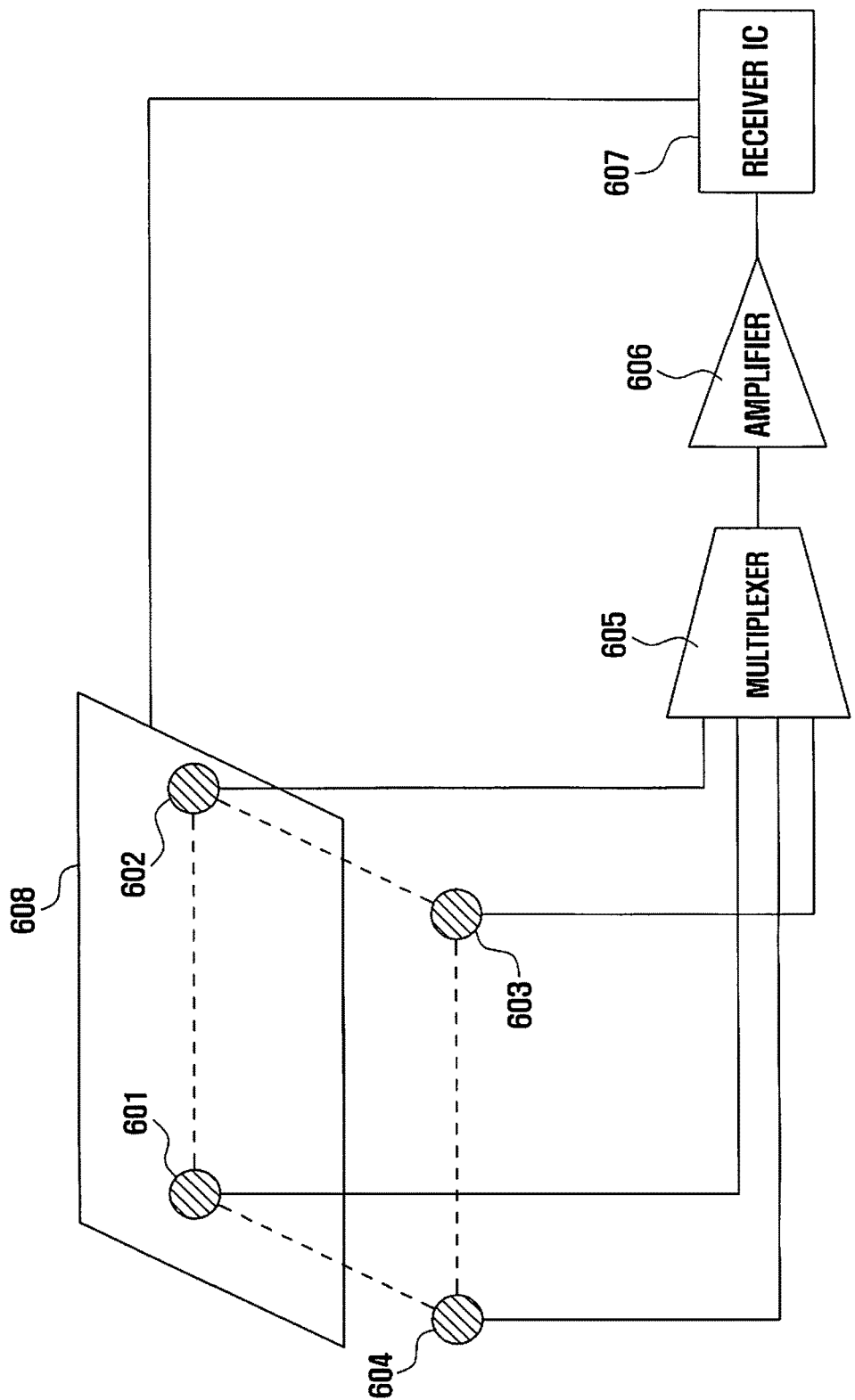

FIG. 11 and FIG. 12 are diagrams illustrating the connection between a receiving electrode array and a receiver IC, in an apparatus for tracking input positions via EFC, according to an embodiment of the present invention.

Referring to FIG. 11, when the user's body approaches a particular position, the apparatus for tracking input positions receives the input electric fields via receiving electrode array 601, 602, 603, and 604. The input electric fields are multiplexed to one line by a multiplexer 605. The multiplexed signals are amplified by an amplifier 606, so that they can be analyzed.

The amplified signals are input to a receiver IC 607. The receiver IC 607 analyzes the magnitudes of electric fields measured by four EFC receiving electrodes, compares them with each other, and then detects the positions of the input electric fields.

As shown in FIG. 12, the apparatus for tracking input positions is implemented to further include a proximity sensor panel 608 in the apparatus shown in FIG. 11. The proximity sensor panel 608 measures how close input electric fields approach the apparatus for tracking input positions. The proximity sensor panel 608 outputs its measured values to the receiver IC 607, so that it can provide the compensation value corresponding to the magnitude of input electric fields according to the degree of proximity in order to measure the position or movement direction of the input electric fields.

In the embodiment as shown in FIG. 12, although the proximity sensor 608 is located at the upper side of the receiving electrode array (electrodes 601, 602, 603, and 604), this embodiment of the present invention may be modified in such a way that the proximity sensor 608 is located at the lower side of the receiving electrode array (electrodes 601, 602, 603, and 604).

As described above, the method and apparatus for tracking input positions via EFC, according to the embodiments of the present invention, can adjust the spacing between grids by controlling the non-contact sensitivity, instead of forming a number of grids, thereby enhancing the resolution. Since signal loss in EFC is varied according to the characteristics of a medium, i.e., human body, the method and apparatus for tracking input positions, according to the embodiments of the present invention, does not need to detect the human body characteristic but can easily perform a compensating operation. If the apparatus for tracking input positions via EFC is associated with display devices, such as a virtual hologram display device or a projection display device, it can detect a user's input position without a thin film technology needed to form grids.

While the present invention has been shown and described with reference to certain embodiments thereof, it will be understood by those skilled in the art that various changes in form and detail may be made therein without departing from the spirit and scope of the invention as defined by the appended claims.

What is claimed is:

1. An apparatus for detecting an input position using Electric Field Communication (EFC), comprising:
    a plurality of electrodes configured to measure a strength of input electric fields radiated from an object; and
    a controller configured to compare the strength of the input electric fields measured at each of the electrode to detect the input position,
    wherein the input electric fields are generated by a voltage supplied by an EFC transmitter which is connected to the object.

2. The apparatus of claim 1, wherein the controller is further configured to form information regarding the input position, detected during a preset time period, into one piece of image data, and to determine a movement direction and a movement distance of the input positions, using the preset time period and the image data.

3. The apparatus of claim 1, wherein the plurality of electrodes are arrayed at each edge of a touch screen.

4. The apparatus of claim 1, wherein the plurality of electrodes are arrayed, in a grid, in a touch screen excluding edges of the touch screen.

5. The apparatus of claim 1, further comprising:
    a sensor panel for measuring a degree of proximity of a system and transmitting the degree of proximity to the controller,
    wherein the controller compensates a magnitude of the input electric fields according to the degree of proximity output from the sensor panel.

6. The apparatus of claim 1, wherein the controller comprises a receiver Integrated Circuit (IC).

7. A method for detecting an input position using Electric Field Communication (EFC), comprising the steps of:
    measuring a strength of electric fields radiated from an object; and
    comparing the strength of input electric fields measured at each of the electrode to detect the input position,
    wherein the input electric fields are generated by a voltage supplied by an EFC transmitter which is attached to the object.

8. The method of claim 7, further comprising:
    forming information regarding the input position, generated during a preset time period, into one piece of image data; and
    determining a movement direction and a movement distance of the input position, using the preset time period and the image data.

9. The method of claim 7, further comprising:
    measuring a degree of proximity regarding a system that tracks the input positions using EFC; and
    compensating a magnitude of the electric fields according to the degree of proximity.

10. The apparatus of claim 1, wherein the plurality of electrodes are attached to a touch screen and measure the input electric fields in a non-contact manner.

11. The method of claim 7, wherein the electrodes are attached to a touch screen and detect the input electric fields in a non-contact manner.

* * * * *